(12) United States Patent
Plasek et al.

(10) Patent No.: US 6,311,782 B1
(45) Date of Patent: Nov. 6, 2001

(54) APPARATUS FOR TRIMMING AND EDGING GRASS AROUND A LAWN SPRINKLER HEAD

(76) Inventors: Ronald A. Plasek, 9248 Kincaid Ct.; Daniel J. Toolan, 1741 Windward Way, both of Sanibel, FL (US) 33957

( * ) Notice: Subject to any disclaimer, the term of this patent is extended or adjusted under 35 U.S.C. 154(b) by 0 days.

(21) Appl. No.: 09/459,177

(22) Filed: Dec. 10, 1999

(51) Int. Cl.[7] .............................. B26B 27/00; F16L 45/00

(52) U.S. Cl. ................. 172/13; 172/25; 172/41; 172/123; 30/500; 30/DIG. 7

(58) Field of Search .................................. 172/13, 41, 25, 172/123; 30/500, DIG. 7

(56) References Cited

U.S. PATENT DOCUMENTS

| | | | |
|---|---|---|---|
| 2,779,259 | * | 1/1957 | Kelsey . |
| 3,814,189 | * | 6/1974 | Thompson ................... 30/DIG. 7 X |
| 4,547,966 | * | 10/1985 | Eden ............................ 30/DIG. 7 X |
| 5,133,269 | * | 7/1992 | Charneski ........................ 172/111 X |
| 5,938,290 | * | 8/1999 | Mikeska ....................... 30/DIG. 7 X |

* cited by examiner

*Primary Examiner*—Christopher J. Novosad
(74) *Attorney, Agent, or Firm*—William E. Noonan

(57) ABSTRACT

An edging and trimming apparatus for a lawn sprinkler head includes an elongate rotary shaft carrying an annular rotary blade at a lower end thereof. The opposite upper end of the shaft is releasably interconnected to a rotary auger motor. The motor drives the shaft axially and rotates the blade to perform edging and trimming of the grass surrounding a standard sprinkler head.

12 Claims, 2 Drawing Sheets

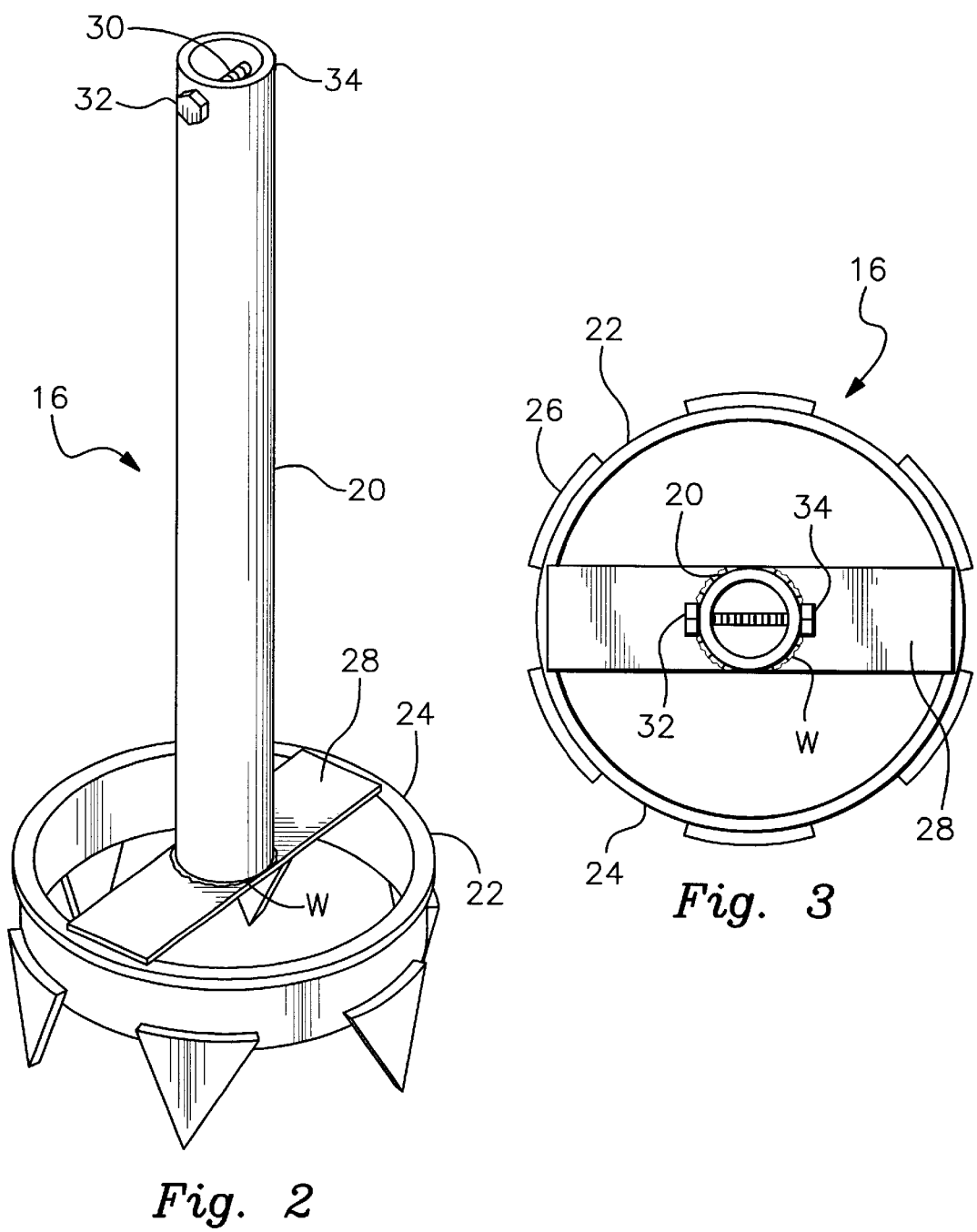

APPARATUS FOR TRIMMING AND EDGING GRASS AROUND A LAWN SPRINKLER HEAD

FIELD OF THE INVENTION

This invention relates to a rotary cutter for trimming and edging grass that surrounds a standard lawn sprinkler head.

BACKGROUND OF THE INVENTION

Trimming and edging around a conventional lawn sprinkler head is often a time-consuming and tedious task. The grass surrounding the sprinkler head is often thick and tends to grow over the sprinkler head. Constant edging is required to permit the sprinkler to operate properly. Traditionally, this work by the landscaper or gardener must be performed by hand or using a device such as a Weed Eater™. Hand edging is tedious and wholly impractical when a large number of sprinkler heads are involved. Conventional power trimmers often do not provide a neat and precise cut. Moreover, these types of trimming devices do not satisfactorily edge around the sprinkler head.

The Weed Eater™ device exhibits a number of other disadvantages when used to trim around sprinkler heads. Its motor usually must be started before the trimmer is positioned adjacent the head. Otherwise, the device is not powerful enough to start against the resistance of the turf. Moreover, the standard trimmer is quite long and must be held away from the body. The user is therefore unable to apply downward force to the trimmer to aid in cutting. Conventional "fishing line" type trimmers tend to bounce over the thick grass, which often surrounds sprinkler heads. These type of cutters also tend to scar the head and other objects.

Rotary cutters have been developed specifically for edging around sprinkler heads. However, most of these devices are manually operated and using them requires considerable time, effort and exertion. Certain known devices have utilized a rotary blade that is releasably attached to a power drill. However, using these types of devices is inconvenient because the landscaper must normally bend or kneel over each sprinkler head to perform the required edging and trimming. Most known sprinkler head cutters also employ a multiple piece and rather flimsy construction. Today, these known devices do not trim and edge around the sprinkler head in an optimally quick and effective manner.

SUMMARY OF INVENTION

It is therefore an object of the present invention to provide an apparatus for quickly, conveniently and effectively trimming and edging the turf that surrounds a standard lawn sprinkler head.

It is a further object of this invention to provide an apparatus that enables a large number of sprinkler heads to be edged much more quickly and effectively than is accomplished by using conventional cutters, trimmers and edgers, and which therefore reduces labor costs and worker tedium.

It is a further object of this invention to provide a motorized apparatus that enables a person to edge around a lawn sprinkler from a standing position, without having to bend, stoop or kneel.

It is a further object of this invention to provide a sprinkler head edger that employs a rugged and durable one-piece construction and which features a long service life.

It is a further object of this invention to provide a sprinkler head trimming and edging device that does not require frequent maintenance and repair.

It is a further object of this invention to provide a sprinkler head trimming and edging device driven effectively, efficiently and reliably by a wide variety of conventional auger motors such that an effective low speed/high torque cutting action is achieved.

It is a further object of this invention to provide a landscaping device that performs both edging and trimming of grass surrounding a sprinkler head and which accomplishes these tasks in a manner much more quickly and effectively than known landscaping tools.

It is a further object of this invention to provide a device for trimming and edging around sprinkler heads that permits the user to apply an increased leverage and cutting force to the cutting blade so that improved results are achieved.

It is a further object of this invention to provide a sprinkler head edger and trimmer that does not employ multiple parts, which are subject to constant failure and which require frequent repair or replacement.

This invention results from the realization that significantly improved trimming and edging around a sprinkler head may be achieved by attaching a rotary cutting head to the lower end of an auger driven rotary shaft having a length of approximately 24 inches (and definitely between 18–30 inches). Using a shaft of this length allows the user to stand directly over the sprinkler head while cutting. The user is able to bear down on the device with increased leverage and force so that the grass around the head is trimmed quickly, conveniently and effectively. Additionally, the use of an auger provides the shaft and rotary cutting blade with a low speed and high torque that accomplishes improved cutting results and permits the trimmer to be started while in position against the grass. Much faster and more effective edging is thereby achieved.

This invention features an edging and trimming apparatus for lawn sprinkler heads. The apparatus includes an elongate shaft. A rotary cutting blade is connected to a lower end of the shaft. There are means connected to an opposite upper end of the shaft for driving the shaft axially rotatably such that the rotary blade is rotated. The diameter of the rotary blade is sufficiently large such that the rotary blade surrounds a standard lawn sprinkler head. The blade engages the grass and turf surrounding the sprinkler head and is rotated to trim and edge around the sprinkler head.

In a preferred embodiment, the shaft and the rotary blade are permanently interconnected. The rotary blade may include an annular member and a plurality of teeth may be attached to and depend from the annular member. The lower end of the shaft and the rotary blade may be interconnected by a mounting bar. The mounting bar may be permanently secured to the lower end of the shaft. The bar preferably extends diametrically across the rotary cutter and, more particularly, across the annular member. The bar may be permanently secured proximate its respective ends to the annular member.

Means may be provided for releasably attaching the shaft to the means for rotating. The shaft may include a tubular element and the means for attaching may include a screw that extends laterally through the tubular shaft. The means for rotating may comprise a rotary motor of the type that drives a conventional auger. The motor may include a drive shaft that is receivable by the tubular shaft. Typically, the drive shaft includes a transverse hole that is engaged by the lateral screw or other type of pin carried by the tubular shaft. When the pin is interengaged through the tubular shaft and the drive shaft, the tubular shaft and rotary cutter are releasably attached to the drive shaft. Operating the rotary motor thereby rotatably drives the rotary blade to perform the required edging and/or trimming task.

DETAILED DESCRIPTION OF PREFERRED EMBODIMENTS

Other objects, features and advantages will occur from the following description of preferred embodiments and the accompanying drawings, in which:

FIG. 2 is an upper perspective view of the cutting blade and permanently attached mounting shaft; and FIG. 3 is a top plan view of the cutting blade and mounting shaft.

Figure 1:
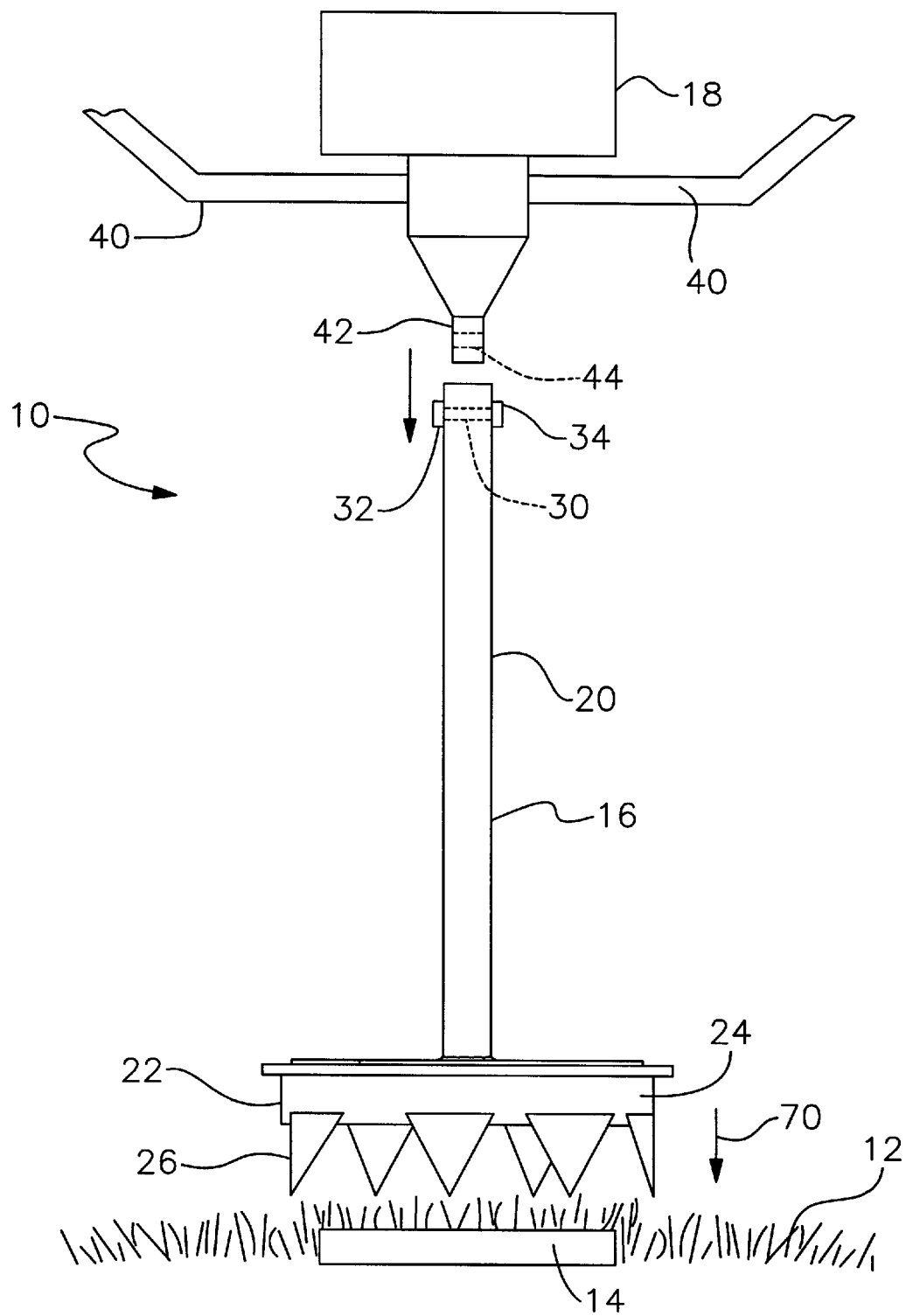
FIG. 1 is an elevational side view of a preferred sprinkler head edging and trimming apparatus in accordance with this invention.

There is shown in FIG. 1 a rotary apparatus 10 for edging and trimming the grass 12 surrounding a standard lawn sprinkler head 14. The sprinkler head may comprise a pop-up device or various other known types of sprinkler heads. The apparatus of this invention may also be used to edge around annular rings or donuts that are commonly installed about a sprinkler head. It has been determined that apparatus 10 is extremely convenient for use on golf courses and in other venues wherein a large number of sprinkler heads are employed for irrigation and watering purposes.

Apparatus 10 includes an edging and trimming member 16 and a standard rotary motor 18 of the type commonly used to drive a conventional auger. Edging and trimming member 16, shown alone in FIGS. 2 and 3, includes an elongate rotary shaft 20 that is composed of steel, aluminum or some other durable metal or metal alloy. As best shown in FIG. 2, shaft 20 comprises an elongate tube having a length of approximately 18 to 30 inches. Preferably the shaft should be about 24 inches long so that the user can stand upright over apparatus 10 while using the tool to edge and trim a sprinkler head.

A rotary cutting blade 22 is permanently mounted to the lower end of shaft 20. Blade 22 includes an annular component 24 having a plurality of triangular cutting teeth 26 welded or otherwise mounted permanently thereon. The cutting teeth 26 are spaced equally about the outwardly facing surface of component 24 and depend from the annular component to define a generally circular rotary cutting blade. An elongate bar 28 extends diametrically across annular member 24 and is permanently secured to an upper surface of the annular member by welding or similar means. Shaft 20 is secured permanently to the upper surface of bar 28 such as by welding W. Shaft 20 extends upwardly from bar 28 and is axially aligned with annular member 24. It should be understood that various other rotary cutting blade constructions may be featured. For example, the blade may include teeth that are formed unitarily in an annular member.

A mounting bolt 30 extends laterally through tubular shaft 20 proximate an upper end of the shaft. The bolt may alternatively comprise various other types of pins or connectors and extends between opposing holes formed in tubular shaft 20. A pair of nuts 32 and 34 secure bolt 30 in place within shaft 20. If an unthreaded connector pin is used, that pin may be held in place, for example, by a cotter pin. This bolt or pin is utilized to interconnect the shaft 20 and rotary cutting blade 22 to the rotary drive mechanism in a manner described more fully below. Alternative means may be employed for releasably attaching the shaft to a rotary motor within the scope of this invention. For example, in some versions shaft 20 may fit within a tubular drive shaft or chuck depending from the auger motor. In such cases the rotary shaft may be tubular or solid. A pin-type interconnection, similar to that described in the embodiment of FIGS. 1–3, may be used to releasably attach the rotary shaft to the drive shaft.

The construction of rotary motor 18, FIG. 1, is conventional and does not comprise a part of this invention. The rotary motor that is utilized may be any one of a variety of standard rotary motors of the type used to drive a low speed high/torque auger. Eskimo® or Earthquake® brand auger motors manufactured by Ardisam Inc. are effective for use in this invention. A two-horsepower, $49^{CC}$ Tecumseh™ engine also works particularly well. It has been determined that the most effective cutting and edging is performed by a rotary motor having a low speed and high torque. A torque of approximately 20 pounds is preferred. A motor having a rating of between 2 and 4 horsepower provides sufficient torque for cutting through thick turf. The speed exhibited by a standard one-man upright auger is sufficiently low so that the cutting blade 20 does not continuously spin as the device is cutting through the grass. Motor 18 includes a pair of handles 40 that provide the user with a secure and reliable grip. The motor also includes a drive shaft 42. A transverse hole 44 is formed through the drive shaft.

Edging and cutting component 16 is releasably connected to rotary motor 18 in the manner shown in FIG. 1. In particular, drive shaft 42 of motor 18 is inserted into the central bore of rotary shaft 20. Before the drive shaft is inserted into the rotary shaft, at least one of the nuts 32, 34 and locking pin or bolt 30 are removed from shaft 20. Drive shaft hole 44 is aligned with the opposing holes formed in the rotary shaft (and opened by removal of pin 30). When these holes are aligned, pin 30 is replaced through the opposing holes in shaft 16 and through the aligned hole 44 in drive shaft 42. The nuts 32 and 34 are replaced on the pin and shaft 20 is operably secured to drive shaft 42.

To operate apparatus 10, edging and cutting component 16 is connected to rotary motor 18 in the above-described manner. The rotary motor is then started and the landscaper positions the apparatus over sprinkler head 14, in the manner shown in FIG. 1. Unlike conventional trimmers, the motor of apparatus 10 may also be started after the apparatus is positioned over head 14 with blade 22 against grass 12. Grasping handles 40, the landscaper lowers the rotary cutting blade 22 in the direction of arrow 70. Annular member 24 has a diameter (i.e., 7"–8" for residential and commercial applications, respectively) that is slightly larger than diameter of the standard sprinkler head 14. As a result, teeth 26 engage the grass and turf surrounding the sprinkler head and perform quick and effective edging and trimming around the sprinkler head. The weight of the auger motor, as well as the leverage exerted by the user standing directly over the cutting apparatus, increase the downward force applied by the cutting blade against the grass. This facilitates and improves the cutting results. The cutting operation is performed in a matter of seconds. Unlike prior rotary trimmers, which require the user to tediously bend, kneel or stoop over each sprinkler head, the relatively long (i.e. 18–30 inch) rotary shaft 20 of apparatus 10 allows the user to remain standing. Numerous sprinkler heads, such as are found on a golf course may be effectively trimmed and edged much less arduously and in a fraction of the time required by known devices. Worker tedium and labor costs are thereby reduced significantly and labor efficiency is improved greatly. Workers also experience far fewer lower back problems. Unlike conventional trimmers, apparatus 10 does not have to be started until the blade is positioned about the sprinkler head and against the turf. This reduces potential accidents and enables quick and effective positioning and operation of the trimmer. Such operation is possible only because the auger blade exhibits sufficient torque to start rotation of the blade notwithstanding its engagement with the grass.

The low speed/high torque operation of the rotary cutting apparatus effectively edges the grass surrounding the sprinkler head even when dense or thick grasses or turfs are encountered. At the same time, damage to the lawn and to the sprinkler head are minimized. An auger is particularly preferred because it provides the required low speed/high torque operation and is especially suited to be held at torso level by the user. Apparatus 10 allows for a very efficient and heretofore unappreciated use of a standard auger motor.

It should be noted that in alternative embodiments, the edging and cutting component 16 may be composed of separate pieces. For example, shaft 20 may be releasably connected to rotary cutting blade 22. However, it is preferred that the individual parts of member 16 be permanently interconnected (effectively in a single piece) so that apparatus 10 is more solid and durable and operates without having to be frequently repaired or refurbished. The permanent interconnection between the mounting shaft and the rotary blade also enables cutting and edging to be performed much more effectively because the parts do not loosen and jiggle, and the cutter has a heavy, durable and rugged one-piece construction.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. An apparatus for edging and trimming grass around a lawn sprinkler head, said apparatus comprising:
    a drive mechanism including a rotary auger motor have a rating of two-horsepower to four-horsepower, a handle attached to said motor and a drive shaft connected to and rotatably driven by said motor;
    an elongate rotary shaft that is at least 18" and not greater than 30" in length;
    an annular blade that is axially aligned with and attached to said rotary shaft proximate a lower end of said rotary shaft; and
    means for releasably attaching said rotary shaft to said drive shaft such that a user standing substantially upright, grasping said handle of said auger motor and engaging said annular blade with the grass surrounding the sprinkler head operates said motor to drive said rotary shaft and said annular blade axially rotatably, whereby the engaged grass is trimmed and edged by said annular blade.

2. The apparatus of claim 1 in which said rotary shaft includes a tubular member.

3. The apparatus of claim 2 in which the drive shaft includes a transverse hole and said tubular member includes a corresponding pair of opposing transverse holes that align with the hole in the drive shaft, said means for releasably attaching including a connector that is inserted through said opposing holes in said tubular member and the aligned hole in the drive shaft and means for provisionally holding said connector in place to releasably interconnect said mounting shaft and the drive shaft.

4. The apparatus of claim 3 in which said tubular member receives the drive shaft.

5. The apparatus of claim 1 further including a mounting bar that extends diametrically across and is fixed to said annular blade proximate respective ends of said bar; a lower end of said shaft being fixed permanently to said mounting bar.

6. The apparatus of claim 1 in which said annular blade includes an annular component having a plurality of teeth depending therefrom.

7. The apparatus of claim, in which said rotary shaft has a length of approximately 24 inches.

8. The apparatus of claim 1 in which said motor has a speed of approximately $49^{CC}$ and a torque of approximately 20 pounds.

9. A method for edging and trimming grass around a lawn sprinkler head, said method comprising:
    providing an apparatus that includes a drive mechanism having a rotary auger motor with a rating of two-horsepower to four-horsepower, a handle attached to the motor and a drive shaft connected to and rotatably driven by the motor, an elongate rotary shaft that is at least 18" and not greater than 30" in length, an annular blade that is axially aligned with and attached to the rotary shaft proximate a lower end of the rotary shaft and means for releasably attaching the rotary shaft to the drive shaft such that the rotary shaft and the drive shaft are axially aligned;
    standing upright, grasping the handle and positioning the blade over the sprinkler head and against the grass while the motor is deactivated; and
    starting the auger motor to rotatably drive the blade against the grass, whereby the grass against which the blade is positioned is edged and trimmed.

10. The method of claim 9 further including operating the motor to rotate the blade with a speed of approximately $49^{CC}$ and a torque of approximately 20 pounds.

11. An apparatus for edging and trimming grass around a lawn sprinkler head, said apparatus comprising:
    a drive mechanism including a rotary auger motor have a rating of two-horsepower to four-horsepower, a handle attached to said motor and a drive shaft connected to and rotatably driven by said motor;
    an elongate rotary shaft that is at least 18" and not greater than 30" in length;
    an annular blade that is axially aligned with and attached to said rotary shaft proximate a lower end of said shaft; and
    means for releasably attaching said rotary shaft to said drive shaft such that a user standing substantially upright, grasping said handle of said auger motor and engaging said annular blade with the grass surrounding the sprinkler head operates said motor to drive said rotary shaft and said annular blade axially rotatably, whereby the engaged grass is trimmed and edged by said annular blade;
    said rotary shaft including a tubular member for receiving said drive shaft, said tubular member having a pair of opposing transverse holes formed proximate an upper end thereof, said drive shaft including a transverse hole that is alignable with said transverse holes in said tubular member, said means for releasably attaching including a connector that is insertible through said opposing holes in said tubular member and said transverse hole in said drive shaft and means for provisionally holding said connector in place to releasably interconnect said rotary shaft and said drive shaft.

12. The apparatus of claim 11 further including a substantially horizontal mounting bar that extends diametrically across and is fixed to said annular blade proximate respective ends of said bar, a lower end of said rotary shaft being permanently fixed to said mounting bar.

* * * * *